(12) United States Patent
Horvitz et al.

(10) Patent No.: US 7,305,437 B2
(45) Date of Patent: Dec. 4, 2007

(54) METHODS FOR AND APPLICATIONS OF LEARNING AND INFERRING THE PERIODS OF TIME UNTIL PEOPLE ARE AVAILABLE OR UNAVAILABLE FOR DIFFERENT FORMS OF COMMUNICATION, COLLABORATION, AND INFORMATION ACCESS

(75) Inventors: Eric J. Horvitz, Kirkland, WA (US); Carl M. Kadie, Bellevue, WA (US); Andrew W. Jacobs, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/047,128

(22) Filed: Jan. 31, 2005

(65) Prior Publication Data
US 2005/0132004 A1    Jun. 16, 2005

Related U.S. Application Data

(62) Division of application No. 09/894,087, filed on Jun. 28, 2001, now abandoned.

(51) Int. Cl.
*G06F 15/16* (2006.01)
(52) U.S. Cl. ............... 709/204; 709/205; 709/206; 706/21
(58) Field of Classification Search ........... 709/200, 709/11, 45, 46
See application file for complete search history.

(56) References Cited

U.S. PATENT DOCUMENTS 5,493,692 A   2/1996   Theimer et al.

(Continued)

FOREIGN PATENT DOCUMENTS

WO   9800787   1/1998

OTHER PUBLICATIONS

Eric Horvitz, et al., "Coordinate: Probabilistic Forecasting of Presence and Availability", Proceedings of the 18th Conference on Uncertainty and Artificial Intelligence, Jul. 2002, pp. 224-233, Morgan Kaufmann Publishers, Edmonton, Alberta.

(Continued)

*Primary Examiner*—Yves Dalencourt
(74) *Attorney, Agent, or Firm*—Amin, Turocy & Calvin, LLP

(57) ABSTRACT

A system and method are provided to learn and infer the time until a user will be available for communications, collaboration, or information access, given evidence about such observations as time of day, calendar, location, presence, and activity. The methods can be harnessed to coordinate communications between parties via particular modalities of interaction. The system includes a user state identifier that determines a user's state from background knowledge, the flow of time, or one or more context information sources. A data log can be employed to store information about user state changes and observational evidence to accumulate statistics and build inferential models of the availability and unavailability of users for different kinds of communication, collaboration, and information access. A forecaster is constructed from the accumulated statistics and/or learned models to enable a determination of a user's likely return, or, more generally, the probability distribution over a user's likely return to particular states of availability. The forecaster can be employed to cache information for offline access, drive displays of availability and unavailability, to send messages that include availability forecasts, and to automatically perform scheduling or rescheduling of communications.

18 Claims, 15 Drawing Sheets

U.S. PATENT DOCUMENTS

| | | |
|---|---|---|
| 5,544,321 A | 8/1996 | Theimer et al. |
| 5,555,376 A | 9/1996 | Theimer et al. |
| 5,603,054 A | 2/1997 | Theimer et al. |
| 5,611,050 A | 3/1997 | Theimer et al. |
| 5,812,865 A | 9/1998 | Theimer et al. |
| 5,930,828 A | 7/1999 | Jensen et al. |
| 6,021,403 A * | 2/2000 | Horvitz et al. ............... 706/45 |
| 6,466,232 B1 | 10/2002 | Newell et al. |
| 6,499,021 B1* | 12/2002 | Abu-Hakima ............... 706/10 |
| 6,513,046 B1 | 1/2003 | Abbott, III et al. |
| 6,549,915 B2 | 4/2003 | Abbott, III et al. |
| 6,747,675 B1 | 6/2004 | Abbott et al. |
| 6,791,580 B1 | 9/2004 | Abbott et al. |
| 6,801,223 B1 | 10/2004 | Abbott et al. |
| 6,812,937 B1 | 11/2004 | Abbott et al. |
| 6,842,877 B2 | 1/2005 | Robarts et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0032689 A1 | 3/2002 | Abbott, III et al. |
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0076025 A1 | 6/2002 | Liversidge et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2003/0046401 A1 | 3/2003 | Abbott et al. |
| 2003/0154476 A1 | 8/2003 | Abbott, III et al. |
| 2004/0117443 A1* | 6/2004 | Barsness ............... 709/204 |
| 2005/0034078 A1 | 2/2005 | Abbott et al. |

OTHER PUBLICATIONS

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994, pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, pp. 94-104, vol. 265—No. 3.

Metcalfe, Bob."After 35 Years of Technology Crusades, Bob Metcalfe Rides Off Into the Sunset." (Sep. 2000) Infoworld, web pages 1-4, at http://www.infoworld.com/AppDev/1161/IWD000925opmetcalfe_cto.

Horvitz, et al. "Attention sensitive Alerting" (Jul. 1999) Proceedings of UAI '99 Conference on Uncertainty and AI, Morgan Kaufman: San Francisco, pp. 305-313.

Horvitz, "Principles of Mixed Initiative User Interfaces" Artificial Intelligence Journal, 126: 159-196, Elsevier Science (Feb. 2001).

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Morgan. "Optimal Space Allocation on Disk Storage Devices" (Mar. 1974) Communications of the ACM vol. 17, No. 3, pp. 139-142.

Horvitz, et al. "Attention-Sensitive Alerting" (Jul. 1999) Proceedings of UAI 1999 Conference on Uncertainty and AI, Morgan Kaufmann: San Francisco, pp. 305-313.

* cited by examiner

Priorities *TimeWave*:
Learning about a User's Availability Patterns

- Track presence, durations of absence, conditioned on calendar, time of day, time away, etc.

- Compute probability distribution over time until user expected back

- Coordination, communication applications

METHODS FOR AND APPLICATIONS OF LEARNING AND INFERRING THE PERIODS OF TIME UNTIL PEOPLE ARE AVAILABLE OR UNAVAILABLE FOR DIFFERENT FORMS OF COMMUNICATION, COLLABORATION, AND INFORMATION ACCESS

CROSS-REFERENCE TO RELATED APPLICATIONS

This application is a divisional of U.S. patent application Ser. No. 09/894,087, filed Jun. 28, 2001 which is now abandoned entitled,"METHODS FOR AND APPLICATIONS OF LEARNING AND INFERRING THE PERIODS OF TIME UNTIL PEOPLE ARE AVAILABLE OR UNAVAILABLE FOR DIFFERENT FORMS OF COMMUNICATION, COLLABORATION, AND INFORMATION ACCESS." This application is also related to co-pending U.S. patent application Ser. No. 11/047,527, filed on Jan. 31, 2005 entitled, which is pending "METHODS FOR AND APPLICATIONS OF LEARNING AND INFERRING THE PERIODS OF TIME UNTIL PEOPLE ARE AVAILABLE OR UNAVAILABLE FOR DIFFERENT FORMS OF COMMUNICATION, COLLABORATION, AND INFORMATION ACCESS," co-pending U.S. patent application Ser. No. 11/047,210 filed on Jan. 31, 2005, which is pending entitled, "METHODS FOR AND APPLICATIONS OF LEARNING AND INFERRING THE PERIODS OF TIME UNTIL PEOPLE ARE AVAILABLE OR UNAVAILABLE FOR DIFFERENT FORMS OF COMMUNICATION, COLLABORATION, AND INFORMATION ACCESS,"U.S. patent application Ser. No. 10/609,972, filed on Jun. 30, 2003, entitled, which is now U.S. Pat. No. 7,233,933 "METHODS AND ARCHITECTURE FOR CROSS-DEVICE ACTIVITY MONITORING, REASONING, AND VISUALIZATION FOR PROVIDING STATUS AND FORECASTS OF A USERS' PRESENCE AND AVAILABILITY," and co-pending U.S. patent application Ser. No. 10/881,429, filed on Jun. 30 2004, which is pending enlitled, "COMPOSABLE PRESENCE AND AVAILABILITY SERVICES." The entireties of the above-noted applications are incorporated herein by reference.

TECHNICAL FIELD

The present invention relates generally to computer and communications systems, and more particularly to a system and method to facilitate meetings, collaboration, coordination and communications between message senders and receivers, wherein a prediction model is constructed from past presence, actions, and calendar of a user to forecast the timing of the user's availability status (e.g., likely to be unavailable for the next hour) for a variety of tasks including receiving messages, and/or communications or participating in a meeting.

BACKGROUND OF THE INVENTION

Advanced technology computer and communication systems have transformed many important aspects of human and computer interactions. This is apparent when considering how technology has forever changed electronic communications such as message transmission and retrieval. In the not too distant past, voice-answering machines provided one particular way for a person to electronically capture a message and forward it to another. With technology advancements such as wireless and Internet systems however, electronic messaging systems have become much more sophisticated. These systems may include e-mail, voice mail, pager and cell phone technologies, for example, wherein almost an infinite supply of information may be sent and retrieved in a concurrent manner. Due to the content and volume of available information, and the ever-increasing number of modalities for communicating such information, it has become increasingly difficult for messaging parties to coordinate when and/or how a transmitted message will actually receive a response.

Conventional e-mail systems provide one example of communications and message coordination difficulties between parties. In one possible scenario, an employee may be situated in a foreign country or remote region, wherein voice communications via telephone or other medium is not always possible. The employee may have indicated beforehand to fellow workers, supervisors and loved ones that e-mail provides the most reliable manner in which the employee will actually receive and be able to subsequently respond to a message. Although, conventional e-mail systems can indicate that a transmitted message has been received and opened by the employee, and can include a predetermined/pre-configured reply such as "On vacation for one week", or "Out of the office this afternoon"— assuming the employee remembers to configure the e-mail system, there is currently no automatically generated indication provided to the message sender when and/or how long it will be before the employee may actually respond. Thus, if a home crisis situation were to occur or an important business message needed to get through, message senders can only guess when the employee will potentially receive the message and hope that the message is received and responded to in a timely manner.

As is common in everyday situations, messages are transmitted with varying degrees of urgency, importance, and priority. Often, key meetings need to be arranged at a moments notice in order to address important business or personal issues. Consequently, one or more messages are directed to one or more parties to indicate the urgency of the meeting. Also, messages are often communicated over multiple communications modalities in order to attempt to reach potential parties. For example, a business manager may send e-mails to key parties and follow the e-mail with phone calls, pages or faxes to the parties, wherein voice mails are typically left for non-answering parties. Unfortunately, the manager is often unsure whether non-responding parties have received the messages and is often unable to determine with any degree of confidence when all parties may be available to meet. Therefore, even though modern communications systems have enabled messages to be rapidly transmitted anywhere in the world over a plurality of mediums, there is a need for a system and methodology to provide improved coordination between parties and to mitigate uncertainty associated with when and/or how long it will be before a message receiver responds to a particular message.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and method to facilitate meetings and coordination of communications between message senders and receivers, wherein a prediction model or component is constructed from past presence, actions, and calendar of a user to forecast the timing of a user's availability status for receiving messages and/or communications or participating in meeting. Such inferences can be utilized to report or display the user's status to colleagues globally and/or selectively (depending on the colleague's relationship with the user), and can be employed in a variety of applications such as automated meeting or interactive communications schedulers or re-schedulers, smart caching systems and communication relay systems. However, other applications of the invention are feasible, including finer grained inferences other than the notion of availability. For example, the present invention can employ similar methods to reason about the amount of time until a user will be available for a particular kind of interaction or communications, based on patterns of availability and context. For example, the expected time until a user, who is currently traveling in an automobile will be available for a voice and/or video conference can be determined by learning statistics and building models which can infer this particular kind of availability. In another example, it can be determined when a user will be available to be interrupted with a particular class of alert or notification, based on patterns of availability, and inferences about the workload and associated cost of an interruption.

In one aspect of the present invention, the predictive component on availability is utilized to estimate when a user will likely be in a setting where he/she can or will review messages deemed as urgent, and messages received by a user's system are answered with an adaptive out-of-office message, such as when the message will likely be unseen for some amount of time and/or the message is at least of some urgency, and/or is from one or more people of particular importance to the user. Such selective messages can be populated with dynamically computed availability status, centering for example, on a forecast of how long it will be until the user will likely review a message such as an e-mail, or be available to review the message, or be in a particular situation (e.g., "back in the office"). Other aspects can include determining the time until a user will review different kinds of information, based on review histories, and the time until the user will be in one or more types of settings, each associated with one or more types of feasible communications. Such information can be transmitted to a message sender regarding the user's ability or likelihood to engage in communications, or respond within a given timeframe.

The present invention improves coordination, collaboration, and communications between messaging parties. This may include learning and inferring a period of time a user will be available to receive communications in order that notice may be automatically generated and transmitted to a sender of the communications, wherein the notice concerns the availability and/or likely return of the user. Alternatively, the present invention may be utilized to infer how long a user will be away from particular forms of communication, such as e-mail, for example. Additionally, the present invention can be employed to work automatically, or in collaboration, and in either synchronous or an asynchronous manner, with a contactor, or both the contactor and a contactee, to tentatively reschedule a communication or collaboration of one or more forms, based on inferences relating to availability. When guesses (with or without confirmation) fail to achieve communication, such systems can automatically retry such scheduling until a communication is successful, for example.

Past evidence of the user's comings and goings is logged over time that relates to the presence and/or other states of the user (e.g., availability to communicate now via one or more forms of channels of communication, goals, attention/focus), wherein a probability model may be constructed to predict the amount of time it may take for the user's likely return based upon recent and/or current evidence that the user has been away from location typically associated with different types of communication channels and availabilities, or more directly reason in a non-location-specific manner relating to the time until a user will likely be available for communication with one or more channels or devices (e.g., e-mail, telephone, pager, desk-top computer). Other predictions may include notices that relate to the user's continued availability given an indication of the user's current availability, for example. In this manner, message senders are provided with useful information regarding the probability that a message will likely be received, in a given period of time by a message recipient. Current contextual information relating to the message recipient, such as time of day and calendaring information, along with a plurality of other user contextual inputs may also be considered when determining user availability time periods.

The probability model described above can be utilized to drive a plurality of alternative aspects of the present invention. For example, an e-mail system is provided wherein automated replies are generated and transmitted that indicates the user's expected return. As an example, this may include indicating the amount of time that will pass until the user is expected to return along with the probability that the user will return at that time. More generally, a probability distribution may be shared about the likelihood that a user will return at different times. This may include generating one or more messages regarding the user's return with an updated confidence that the user will actually return in the expected timeframe. Furthermore, this can include updating a shared resource, such as a publicly shared calendar, with such time estimates, including the use of special notations or colors to indicate inferred times away.

The present invention can be employed in conjunction with systems that provide useful information about the user to associates or other information recipients. This can include information about the forecast of when the user will likely see a message, be available to see the message, and/or be available for one or more types of communication. These systems can also keep track of what has been sent and provide updates if predictions turn out to be off, since these predictions are made under uncertainty. For example, if the system sends a note to a collaborating party such as "Sorry, the user is currently at the jobsite; it will probably be at least 2 hours before the user will see the message", and if 4 hours later, the system notices that the user has not yet returned, an update can then be transmitted by the system such as, "I'm sorry, the user still hasn't seen your message."

Another functionality that can be provided is via an automated agent. For example, depending on the sender, the agent can respond with a recommendation about another channel or about changing the nature of the message (e.g., raising the message priority so it will page the user) along with the forecast on availability (e.g., "The user will not likely see your email for 4 hours; You may desire to try him at this number if it is very important; he will likely be available at this number in . . . 30 minutes: 425-555 -1212).

In this example, it can be observed that forecasts about the time to availability of different modalities can be utilized together to help coordinate communications.

According to another aspect of the invention, a priorities messaging service may be provided wherein automated responses of return are generated based upon a predetermined urgency threshold associated with incoming messages above the urgency threshold. Additionally, the automated response can be tailored via a user configuration interface to send automated responses to messages that warrant some type of feedback from the user. User availability and expected return information may also be utilized to guide messaging decisions from automated messaging systems. For example, depending on an inferred or sensed urgency of a given message, and/or depending on who the sender or contactor is, and/or depending on combinations of urgency and the sender, and/or based upon the urgency threshold and the amount of time a user is expected to return to a message location, the message may be directed to a particular device such as a cell phone or pager instead of and/or in conjunction with an e-mail, for example, in order to facilitate that urgent messages have a better chance or reaching a desired party. Additionally, such times can be employed to automatically schedule future communications, such as real-time communications based on a forecast of when a user will have access to one or more modalities of communication.

As will be described in more detail below, the present invention can employ the information regarding the user's likelihood of return or current availability in other systems and processes. This may include voice mail systems, calendaring systems, scheduling systems, automated maintenance systems, and user tracking systems in order to provide useful information feedback to message senders and/or systems regarding the likelihood of establishing contact and making informed decisions based upon the user's expected availability.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention provides a learning and inference system and methodology to determine how long a person or user will be away from particular locations and/or communications sources. Based upon this determination, a plurality of message services and/or applications are provided that facilitate message coordination between parties and mitigates uncertainties associated with transmitting messages and understanding the expected time for reception of the messages. For example, when working with others, it is beneficial to know how long a user will be away from particular location and/or communication tool when attempting to understand if and how messages are communicated to the user. The present invention provides a forecast on the time until a user returns, or will remain away, in various applications and services, including an automated reporting back to colleagues such as information about the estimated amount of time that will likely pass before the user is back at their desk and/or available to respond. One or more statistical processes are provided to help people coordinate with one another and to know when a message will likely be received or that contact can be made.

According to one aspect of the invention, a user state identifier is provided to log comings and goings associated with users and to detect current and/or real-time states of the user (e.g., presence, attention, focus, goals, location). The user state identifier can be based on a desktop events system that records computer desktop interactions, for example. These events, in addition to an optional utilization of other sensors such as motion detectors, cameras and microphones that perform acoustic analysis of conversation or activity, can be employed to identify when a user leaves his or her office or home. Statistics on the comings and goings of the user are then logged in a data store, wherein a probability model is constructed to compute probabilities of interest about the user's return. For example, the probability that a user will return within "x" minutes (or similarly will be away for x minutes), given that a user has been gone for "y"

minutes so far, can be determined and thus employed to forecast the user's availability. The forecasting information may be further utilized to build services that support communication, collaboration and notification between parties. Such statistics can be conditioned on the particular period of the day (e.g., early morning, morning, afternoon, late afternoon, evening, etc.) and the type of day (e.g., normal weekend, normal weekday, vacation, etc.), and on the information available on a user's calendar (e.g., appointment versus no appointment, and appointment type, appointment marked by location, importance, number of attendees, etc.)

Figure 1:
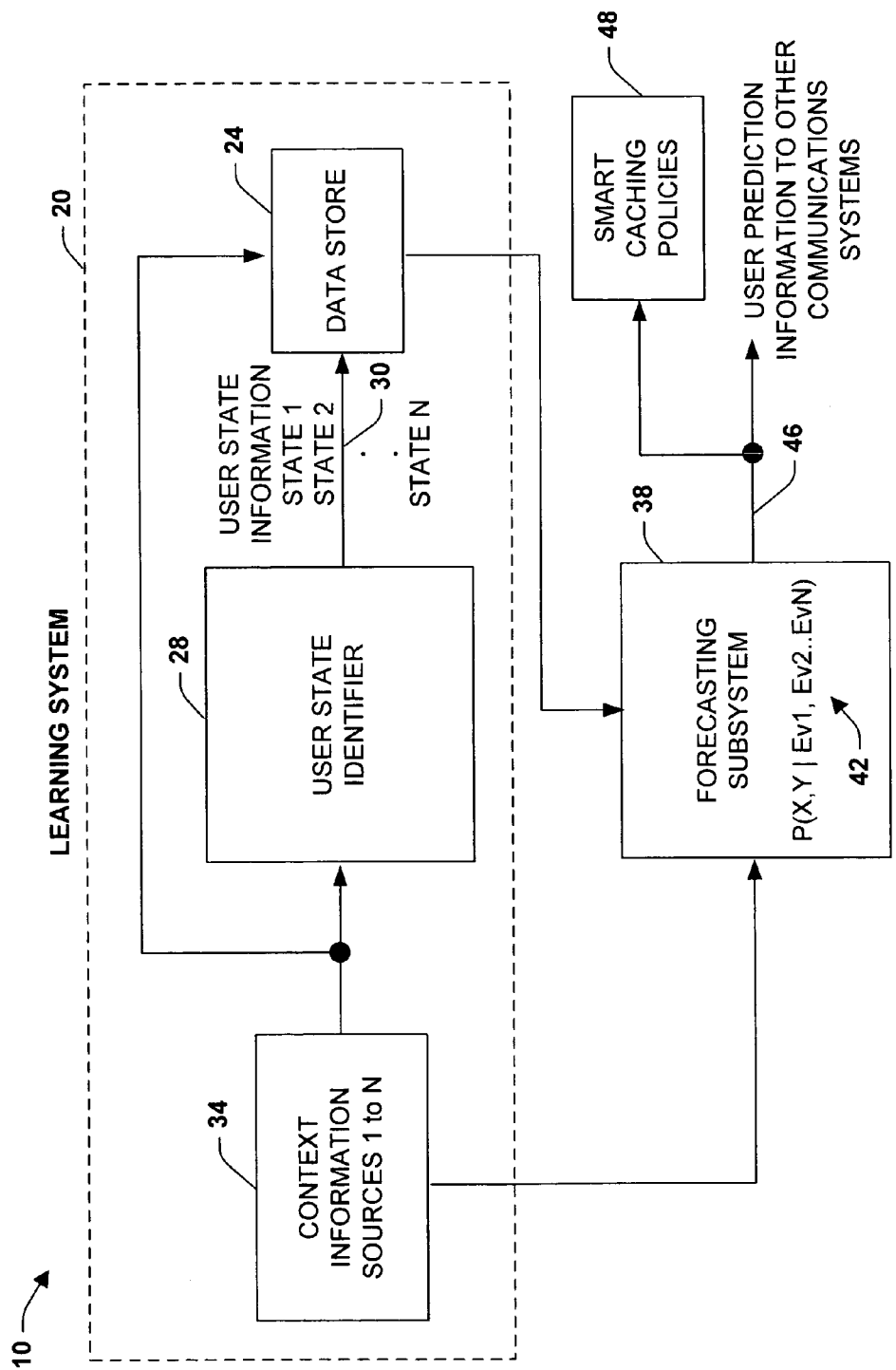
FIG. 1 is a schematic block diagram illustrating a learning and inference system to forecast a user's availability in accordance with an aspect of the present invention.

Referring initially to FIG. 1, a system 10 illustrates learning and inference of a user's availability in accordance with an aspect of the present invention. The system 10 may include a learning system 20 for determining and recording information in a data store 24 relating to a user's actions. The learning system 20 includes a user state identifier 28 that can determine from 1 to N states 30, (N being an integer), relating to a user from one or more context information sources 34. As will be described in more detail below, the context information sources 34 may include indications of user computer desktop activity such as mouse or keyboard action and/or may include sources such as a video or acoustic inputs.

The user state identifier 28 monitors the context information sources 34, determines when a change of the user's state has occurred, and updates the data store 24 with an indication of the context information sources 34 at about the time the change of state has been detected. For example, one possible state for the user may be whether the user is present or not present at a desktop computer. Based upon a statistical determination within the user state identifier 28, it may be determined that based upon value or variable changes in the context information sources 34, that the user has left his or her desktop personal computer.

Context information values, such as the time of day or calendaring information, for example, may then be recorded in the data store 24 at about the point the user state changes. When the user returns, the user state identifier 28 again determines a change in state and again records values associated with the context information sources 34. Thus, information relating to the user's habits and past actions associated with leaving and returning are stored by the learning system 20 at points in time when the user's state has changed. It is noted that a plurality of user states may be determined and detected. For example, these states may include states associated with the user's attention, goals, focus, and location. It is further noted that user state changes may be based on a probability threshold that the user's state has changed. In other words, if the user state identifier detects with a 95% probability that the user is no longer present, a state change can be indicated and contextual information 34 stored in the data store 24.

After information associated with the user's actions have been stored, a forecasting subsystem 38 can access the information in the data store 24 and build a prediction model 42 from the recorded information. The prediction model 42 utilizes current information from the context information sources 34 associated with user actions to generate forecasting information 46 relating to the user's unavailability and likely future return, or current availability and likely future unavailability, for example. The forecasting information 46 can be utilized in a plurality of systems and applications. One such application relates to one or more smart caching policies 48 that are driven from the forecasting information 46. In one application, measures of time until the user returns can be employed to guide the smart caching policies 48. Thus, learning can be conducted via the forecasting subsystem 38 and inferences can be exploited relating to how long until a user's device or system will be in contact with a network or other medium to determine what information should be cached or retrieved given limited bandwidth and/or potentially limited memory. As an example, a determination of how long until a user will likely be away can be employed in conjunction with information access patterns (e.g., how long until various documents, items are needed), wherein an optimization or approximation can be performed to extract a maximum value out of the caching based on the expected time away. In one specific example, a document needed within the next ten minutes may be cached but one needed in an hour may not be, unless the time of disconnection from the network is going to be longer than 1 hour.

Decisions can be made regarding the differential value of caching, wherein the cost associated with not having an item, document, or file when it is needed is considered, given that the item is needed at some time t in the future. The decision can be optimized by considering how long until the user has network availability, for example. Other considerations can include the size of respective documents and employing a knapsack solution to fit the largest value into available memory space. Knapsack solutions, which are well understood, can be employed to maximize the expected utility of having items cached, or to minimize the expected costs associated with the allocation of available storage resources, based on a consideration of probabilities and/or expected values associated with the items.

Referring to the forecasting information 46 described above, a probability can be determined as follows:

p(user will return within x minutes|user has been away for y minutes, $E_1 \ldots E_n$), wherein $E_1 \ldots E_n$ represents a set of evidence that can be observed and logged, and conditioned on when probabilities of interest are determined.

For example, types of evidence may include information on a user's calendar, periods of time, and location. A calendar can encode information about the presence, nature, and location of a meeting and indicate that meetings or other activities are not scheduled for the user, per representation on the calendar. When calendars do not include explicit locations, assumptions or inferences can be made about the typical location of most meetings (e.g., default to a typical meeting that may usually occur in the building, meeting somewhere on corporate campus). In other cases, room numbers and locations may be indicated.

It is noted that other types of evidence of the user's comings and goings can be logged over time that relates to the presence and/or other states of the user. For example, this can include availability to communicate now via one or more forms of channels of communication, goals, attention and/or focus. The prediction model 42 can be constructed to predict the amount of time it may take for the user's likely return based upon recent and/or current evidence that the user has been away from location typically associated with different types of communication channels and availabilities, or more directly reason in a non-location-specific manner relating to the time until a user will likely be available for communication with one or more channels or devices (e.g., e-mail, telephone, pager, desk-top computer).

Period of time evidence, may refer to one of several prototypical periods, such as referring to a cross product of type of day (e.g., weekday, weekend, vacation) and time of day (e.g., including early morning, morning, lunchtime, early afternoon, late afternoon, early evening, late evening, late at night, wee hours of the morning) or in more precise conditionings, finer-grained periods of time, extending to the precision of the clock time. Some applications that are described below may access fine-grained (e.g., GPS information) or coarse-grained location information (e.g., nearest cell phone tower), and employ such information in a statistical learning or real-time inference about the time until a user will return.

Information may be stored of the form, p(x|y, time period, calendar info state, location), or in other forms, such as p(x|y, time period, calendar info state), and p(x|y, time period). As an example, the system 10 can be configured to monitor data of the form p(x|y, time period). Time periods may be separated into a set of periods defined by taking the product of:

e.g., {weekday, weekend} and e.g., {early morning: 6:30am-9am, morning: 9am-11:30am, lunchtime: 11:30am-1:30, early afternoon, afternoon: 1:30pm-4pm, early evening: 4pm-6pm, evening: 6pm-9:30pm, nighttime: 9:30pm-12am, wee morning: 12am-6:30am}

According to another aspect of the invention, an alternate or complementary set of functions can be employed to provide forecasting information regarding the user's availability. For example, a time until a user returns can be determined or refined as an f(distance of meeting, meeting ending time, and/or other factors affecting availability). Probabilistic models can also be constructed such as relating to an f(distance of meeting, meeting ending time, data observed in past).

It is to be appreciated that a plurality of statistical methods and/or processes can be employed for learning and forecasting in accordance with the present invention. For example, a variety of statistical methods, including probabilistic classifiers, support vector machines, Bayesian networks, Bayesian dependency networks, and decision trees (among other statistical tools) can be utilized to learn models that can be employed to determine forecasts, including those forecasts cast as probability distributions, relating to the amount of time until a user returns to a situation i, or to a pattern of communication action j, based on multiple pieces of evidence. This can include how long the user has already been gone, or has not had access to a particular, channel, and other evidence (e.g., time of day, information on the calendar, location of current or last appointment, location of next appointment, type of day—weekend, holiday, weekday, current status of user—on vacation, standard work day, and so forth.)

The time away, for example, can be utilized as a piece of evidence, wherein a Bayesian updating scheme regarding forecast of the total time away can be conditioned on time away so far such as:

$$p(\text{Time away} | \text{Time away so far}) = \frac{p(\text{Time away})p(\text{Time away so far} | \text{Time away})}{p(\text{Time away so far})}$$

where $p(\text{Time away so far} | \text{Time away})$ is one and thus this can be rewritten, $$p(\text{Time away} | \text{Time away so far}) =$$

$$\frac{p(\text{Time away})}{p(\text{Time away so far})}$$

-continued

Including other vectors of evidence, $E$, provides the following:

$p(\text{Time away} | \text{Time away so far}, E) =$ $$\frac{p(\text{Time away} | E)}{\sum_{j=1}^{n} p(\text{Time away so far} | E_j)p(E_j)}$$

Then, to determine the time until return, the expected time until return is computed from the probability distribution above. Beyond time away, such Bayesian inferencing can be focused on particular communication channels or modalities such as:

$p(\text{Time away comm } i | \text{Time away from comm } i \text{ so far}) =$ $$\frac{p(\text{Time away from comm } i)}{p(\text{Time away from comm } i \text{ so far})}$$

and so forth. The general learning of Bayesian network models or Bayesian dependency networks, with the use of Bayesian learning methods, generalize the above probabilistic relationships. It is noted that substantially any factor affecting the user's availability can be considered and utilized in availability determinations.

A set of cases can be collected for the time periods described above. According to one aspect of the present invention, time periods may be considered as including the point in time when a user has left, per the user state identifier 28. Per the detected user state change, the amount of time until a user is noted to return. The forecasting models 42 are employed to predict the probabilities over different times until the user will return based on multiple recorded cases. Given sparse user data or recorded cases, models for changing probabilities may be assumed and parameterized based on cases that have been observed. For example, well-known statistical models from survival curves and hazard functions can provide useful prototypical models for such predictions. The user case data or parametric functions, can be tuned with observed cases, and/or employed with assumed approximate parameters to compute a time x, such that users will return with some probability. Thus, predictions can be made that a user will return within x minutes with a 95% chance, for example. Such data can be utilized in a variety of communications systems services as described below.

Alternative applications of the system 10 can include finer grained inferences other than the notion of availability. For example, the system 10 can employ similar methods to reason about the amount of time until a user will be available for a particular kind of interaction or communications based on patterns of availability and context. For example, the expected time until a user, who is currently traveling in automobile or other situation will be available for a voice and/or video conference can be determined by learning statistics and building models which can infer this particular kind of availability. In another example, it can be determined when a user will be available to be interrupted with a particular class of alert or notification, based on patterns of availability, and inferences about the workload and associated cost of an interruption.

Figure 2:
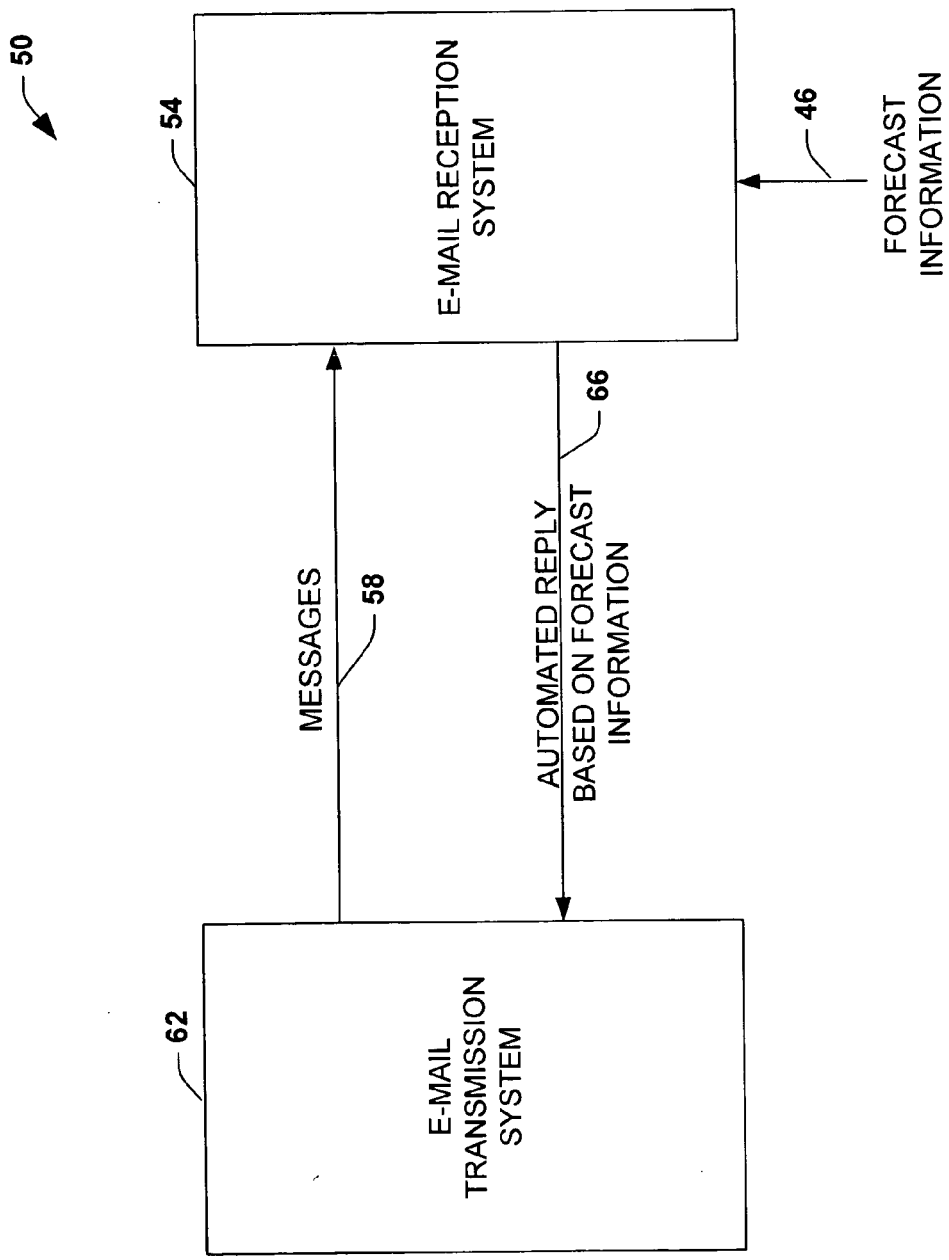
FIG. 2 is a schematic block diagram illustrating an E-mail system in accordance with an aspect of the present invention.

Referring now to FIG. 2, a system 50 illustrates an e-mail service in accordance with an aspect of the present invention. As an example, in the e-mail messaging system 50, a user's computer or e-mail reception system 54 receives one or more messages 58 from one or more e-mail transmission systems 62 to selectively respond to senders, or for e-mail of specific content or detected urgency, an automated reply 66, indicating that the user is currently away but is expected back within x minutes. This may be achieved by utilizing the forecast information 46 described above indicating the user's likely return. It is to be appreciated that the term "expected back" may be indicated in the automated reply 66 by a chance or probability of being back within that time frame (e.g., automated response indicating user to likely be back in 2 hours with 90% probability).

Alternatively, a statement or one or more series of statements or replies may be generated about the time until a user returns with the respective confidences. This may include updating probabilities and confidences over time as new information is received from the context information sources described above. According to another aspect of the invention, the automated responses 66 may be relayed as an average or expected time, computed as a sum of times, weighted by different likelihoods of expected time of return.

It is noted that the system 50 depicted in FIG. 2 can be generalized to substantially any information transfer system. For example, the predictive component, described above, for availability can be employed to estimate when a user will likely be in a setting where he/she can or will review messages 58 deemed as urgent that are received by the user's system 54. The messages 58 can be answered with an adaptive out-of-office message 66, such as when the message 58 will likely be unseen for some amount of time and/or the message 58 is at least of some urgency, and/or is from one or more people of particular importance to the user. Such selective messages can be populated with dynamically computed availability status, centering for example, on a forecast of how long it will be until the user will likely review a message such as an e-mail, or be available to review the message, or be in a particular situation (e.g., "back in the office"). Other aspects can include determining the time until a user will review different kinds of information, based on review histories, and the time until the user will be in one or more types of settings, each associated with one or more types of feasible communications. Such information can be transmitted to a message sender regarding the user's ability or likelihood to engage in communications, or respond within a given timeframe.

Alternatively, the present invention can be employed to work automatically, or in collaboration, and in either synchronous or an asynchronous manner, with a contactor (e.g., message sender or originator), or both the contactor and a contactee (e.g., message receiver), to tentatively reschedule a communication or collaboration of one or more forms, based on inferences relating to availability. When guesses (with or without confirmation) fail to achieve communication, such systems can automatically retry such scheduling until a communication is successful, for example.

It is further noted that other configurations of the present invention are possible. As an example, an expert or user can assess by hand an availability profile, indicating, for example, on a special form or a calendar-like representation, a user's availability for different kinds of activities (e.g., communications, collaboration, coordination, and so forth). Such availability profiles can be conditioned on one or more variables, such as time of day, appointment status, meeting types, sensed activity, and other variables. It is to be appreciated that the availability profile can be provided to one or more other users via substantially any communications component (e.g., calendar, scheduler, e-mail, voice-mail, pager, PDA, and so forth) and such hand-assessed models can be refined through data collection and learning.

Figure 3:
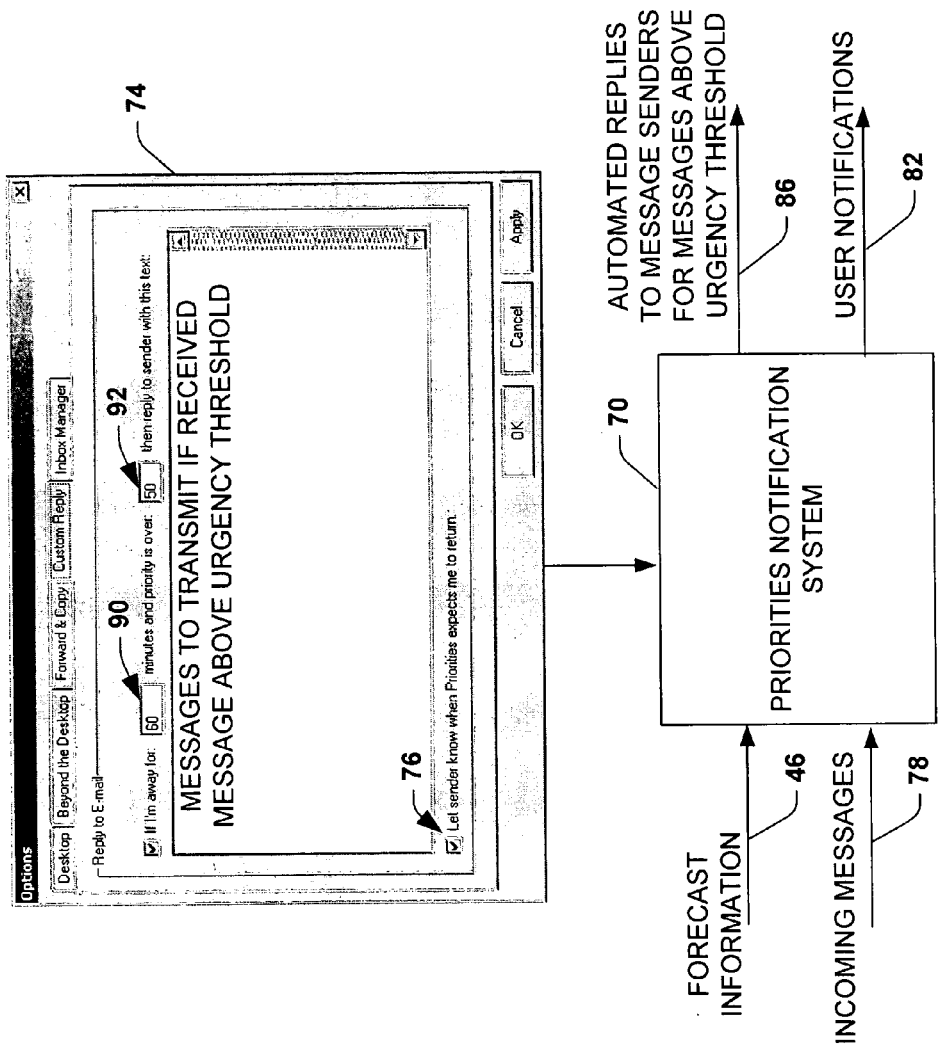
FIG. 3 is a schematic block diagram illustrating a priorities system in accordance with an aspect of the present invention.

Turning now to FIG. 3, a priorities messaging system 70 and user configuration interface 74 is illustrated in accordance with the present invention. The priorities messaging system 70 forwards or transmits incoming messages 78 from a plurality of messages sources (not shown) based upon an inferred and/or determined urgency of the messages. For example, inferences can be made based upon message content and decision-theoretic principals and/or rules-based policies to determine when or where message notifications 82 should be directed to the user. Users can configure the priorities system 70 by checking a box 76, for example, in the user interface 74 to have information about the time expected until they return relayed to senders of messages whose messages receive an urgency score over a predetermined threshold of urgency to warrant an automated message response 86. In this example, the urgency may be configured as being away for greater than a certain period, depicted at reference numeral 90, with an urgency threshold greater than a certain amount, depicted at reference numeral 92, to send an automated reply. Thus, the forecast information 46 can be included with automated responses 86 that are above predetermined urgency and/or other configured thresholds. For example, the amount of time relayed can be the period of time associated with an 85% chance of the user returning within the period.

The amount of time a user is expected to return or remain present can be utilized in guiding messaging decisions, for example, in deciding whether a message or appointment request should be sent to a user's pager or cell phone, given the amount of time a user is expected to be away from a message location, the identity of the sender, and, more generally, the sensed or inferred urgency of the message. Therefore, if the message 78, were above the predetermined urgency threshold, and the user was expected to be gone from the message location such as a desk top e-mail location for a predetermined period of time as determined from the forecast information 46, the priorities system 70 can direct messages to other sources such as a cell phone or pager based on the amount of time the user is expected to return to a particular message location and the urgency of the message.

It is noted that the present invention can enable other systems such as an automated system or agent (not shown) to send information to an associate, for example, to include information about the forecast of when the user will likely see a message, or be available to see the message, or be available for one or more types of communication. These systems can also keep track of what has been sent and to send updates out if predictions turn out to be off, since these predictions are being made under uncertainty. For example, if the system 70 sends a reply 86 to a collaborating party such as "Sorry, the user is currently at the jobsite; it will probably be at least 2 hours before the user will see the message", and if 4 hours later, the system 70 determines that the user has not yet returned, an update 86 can then be transmitted by the system 70 such as, "I'm sorry, the user still hasn't seen your message" or other similar message.

Another functionality that can be provided is via an automated agent. For example, depending on the sender, the agent can respond with a recommendation about another channel or about changing the nature of the message (e.g., raising the message priority so it will page the user) along with the forecast on availability (e.g., "The user will not likely see your email for 4 hours; You may desire to try him at this number if it is very important; he will likely be available at this number in . . . x minutes: at this communications modality or number). In this example, it can be observed that forecasts about the time to availability of different modalities can be utilized together to help coordinate communications.

Figure 4:
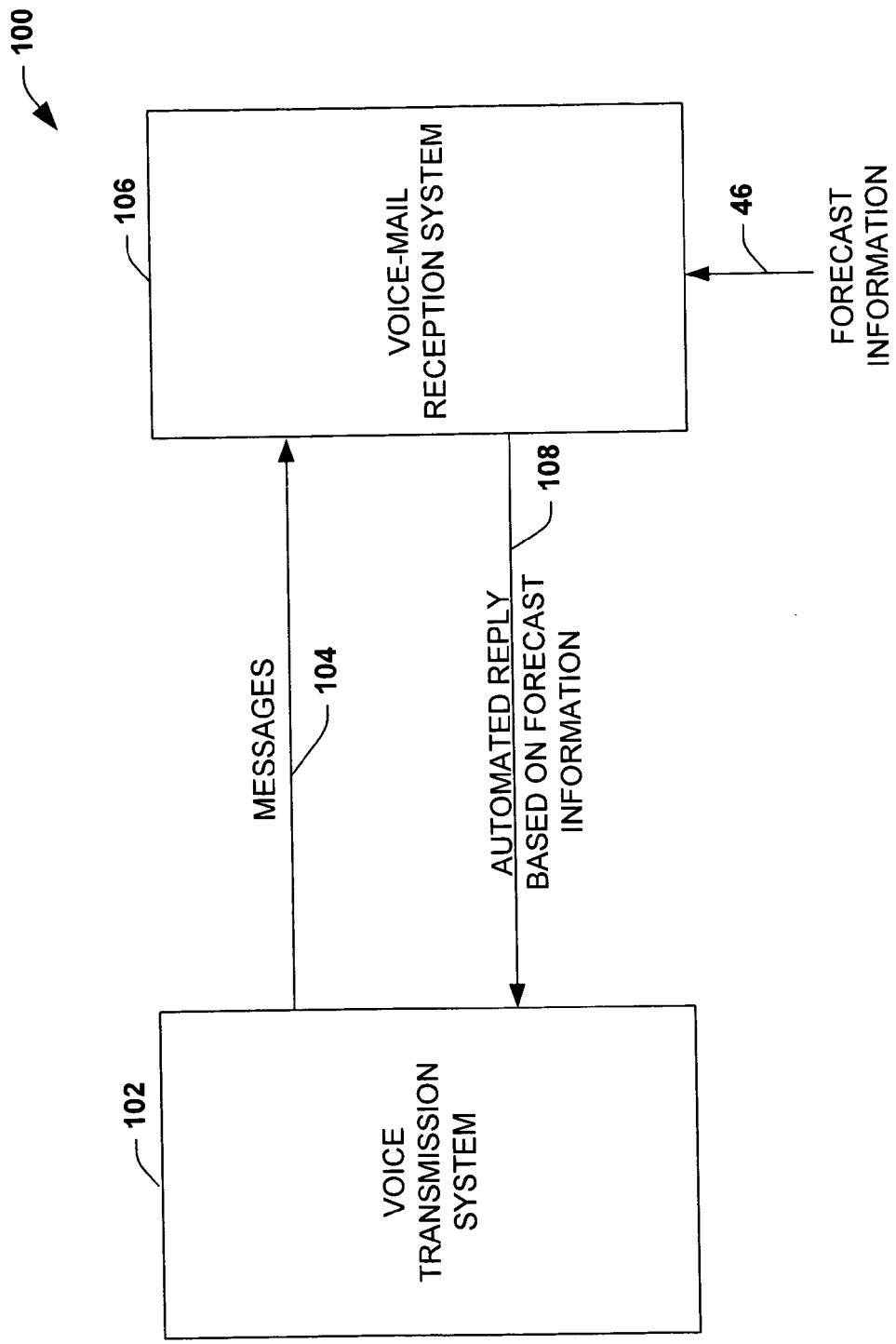
FIG. 4 is a schematic block diagram illustrating a voice mail system in accordance with an aspect of the present invention.

Referring to FIG. 4, a voice mail system 100 is illustrated in accordance with an aspect of the present invention. These systems may include automated answering units and/or computer directed messaging services that generate message replies when a telephone or other answering device is unanswered. As an example, a voice transmission system 102, such as a telephone, may be employed to call or send messages 104 to the user's location, wherein a voice mail reception system 106 generates an automated reply 108 that includes forecast information 46 regarding the user's likely return. For example, the sender of the message 104 may receive a "smart" voicemail message 108, indicating the user is unavailable with an attached message indicating when the user may be expected to return. Additionally, automated messages 108 can be generated that attempt to reschedule the call, based on considerations of the user's return.

Figure 5:
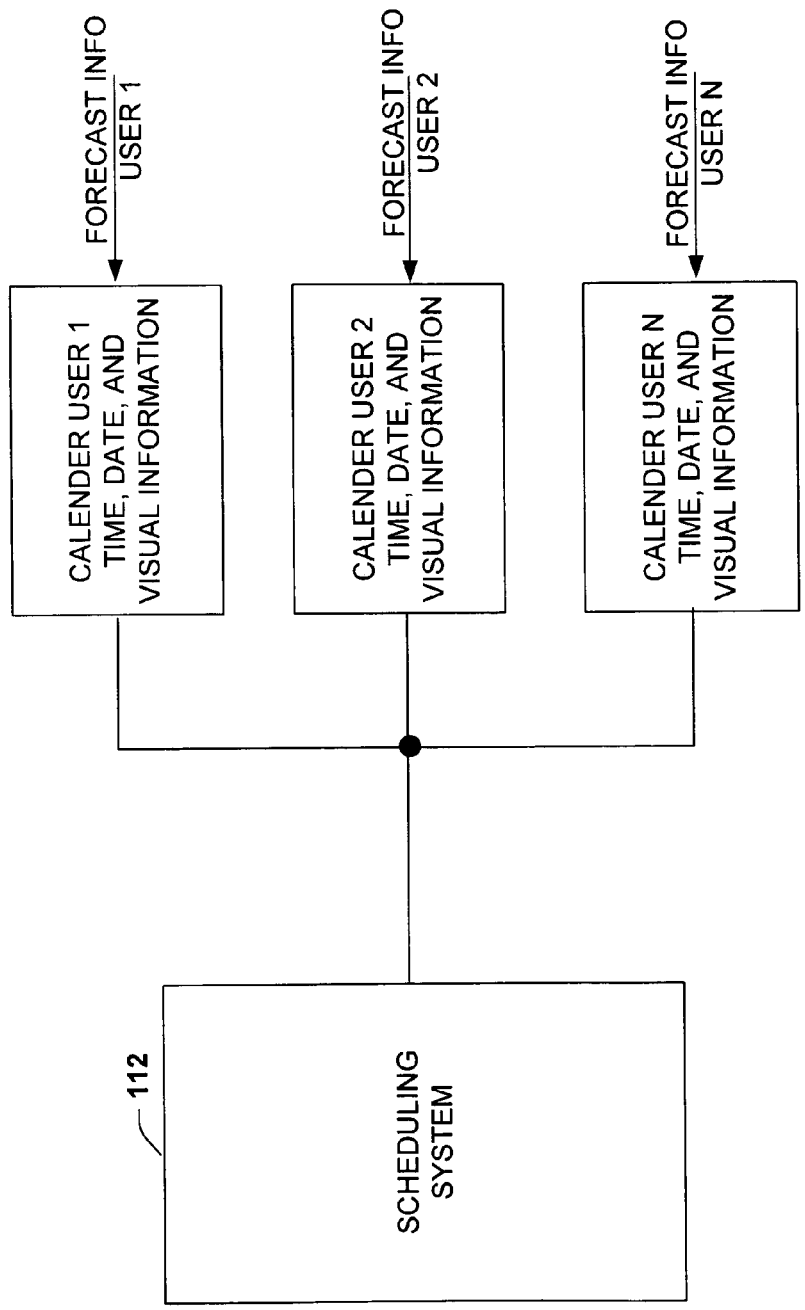
FIG. 5 is a schematic block diagram illustrating a scheduling system in accordance with an aspect of the present invention.

Referring now to FIG. 5, a scheduling system 112 is illustrated in accordance with the present invention. Scheduling systems have long been employed to enable users within organizations to schedule meetings or other activities by making available calendaring information associated with a plurality of users. This information is then utilized to schedule meetings based upon information from one or more user's calendars indicating times and dates when all users may be available. With conventional systems, this approach can operate assuming users remember to mark their calendars with expected availability and unavailability information. If this does not occur, meetings are often scheduled with unavailable users who have forgotten or neglected to update the availability information. In accordance with the present invention, one or more user calendars, depicted as calendars 1 through N, may be marked automatically as unavailable and available by utilizing the forecast information, described above, that is generated for the users 1 through N. In this manner, meetings and activities can be scheduled in a more efficient manner regardless of whether a user remembers to explicitly configure periods of availability and unavailability. A special notation (e.g., color, symbol, code) may be optionally provided in the calendar that marks the user's availability information as having been determined from the forecast information. According to another aspect of the invention, a meeting request can be generated indicating a preferred time for a meeting in the near future. Alternatively, if it is determined that a user is likely to still be away (e.g., probability of expected return below threshold), the meeting request can be renegotiated.

Figure 6:
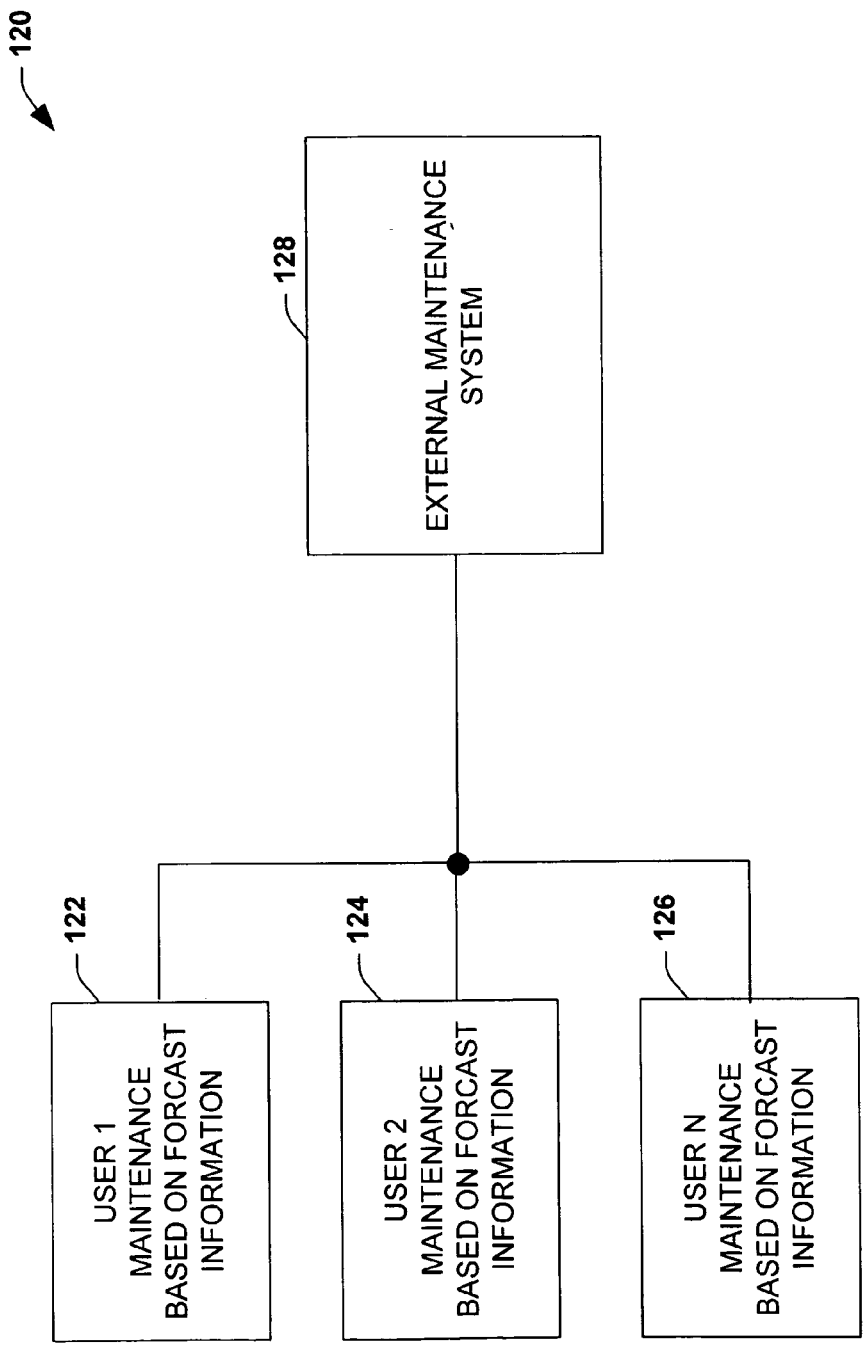
FIG. 6 is a schematic block diagram illustrating an automated maintenance system in accordance with an aspect of the present invention.

Turning to FIG. 6, an automated maintenance system 120 is illustrated in accordance with an aspect of the present invention. The system 120 includes one or more computer systems 1 through N, 122-126, wherein user forecast information can be generated for each of the systems based on the associated user's expected availability or return, as described above. System services or other maintenance procedures can be provided on the computer systems 122-126 such as compressing, de-fragmenting and reorganizing a hard disk, for example, that can be scheduled for times when a user has a high percentage probability of being away for the time required for the operation. It is to be appreciated that a plurality of other procedures may be performed such as checking that system software is at the latest revision level, virus checking and upgrading the software as necessary. In this example, the computers 122-126 utilize the forecast information to reason about When a user is likely to not return for the estimated time for the operation (e.g., expected not to return for 20 minutes with a 90% chance). Alternatively, an external system 128 can perform remote maintenance operations by querying for the forecast information from the systems 122-126. For example, it may require some time to perform virus checking on the respective computer system drives. The external maintenance system 128 can thus schedule this or other procedures from the forecast information regarding the user's expected return.

Figure 7:
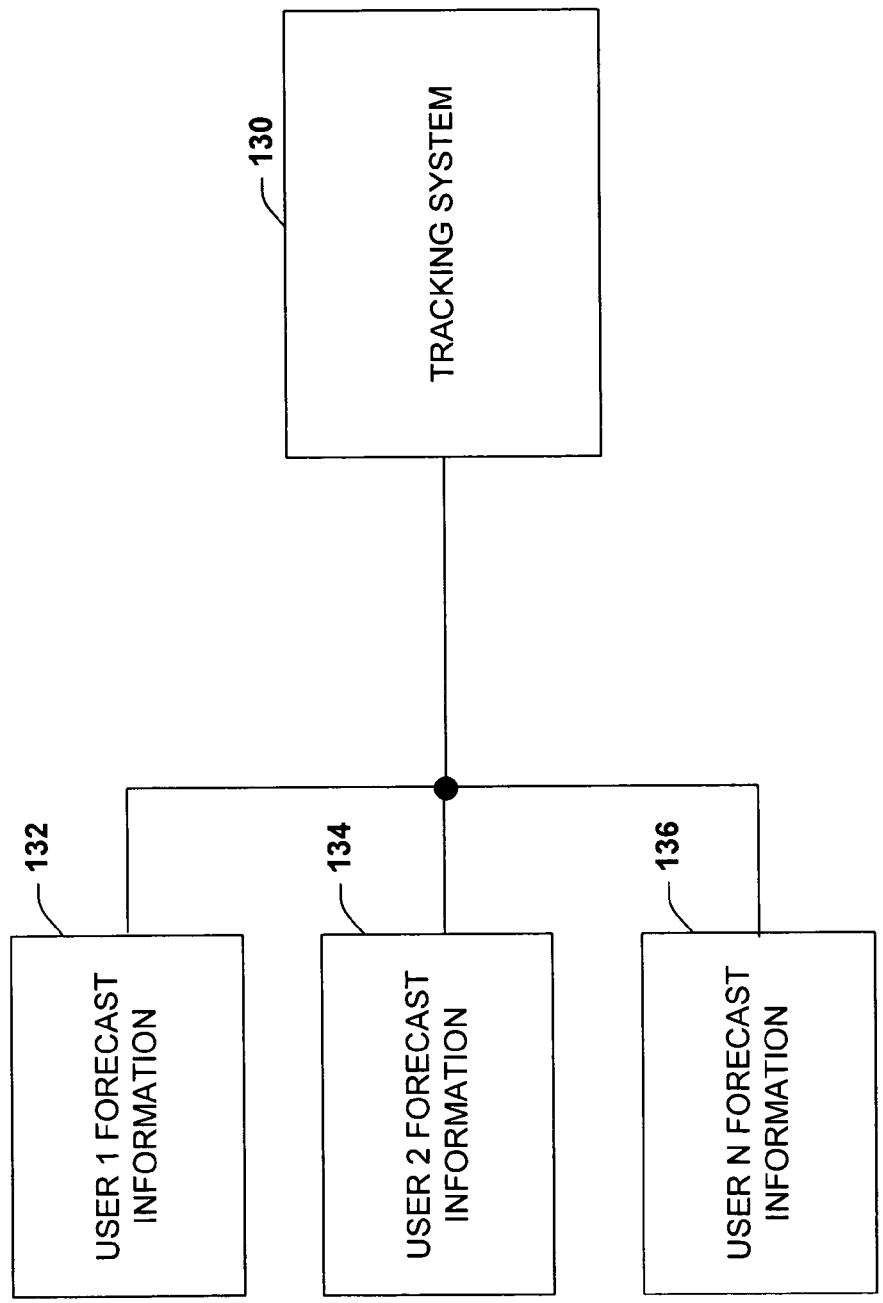
FIG. 7 is a schematic block diagram illustrating a user tracking system in accordance with an aspect of the present invention.

Referring now to FIG. 7, a user tracking system 130 is illustrated in accordance with the present invention. The system 130 can track the time that users tend to take per time of day to return to their office for meetings of various kinds and at various locations when such information is available ending at different times of day. For example, data can be collected from computer systems 132-136 of the form, p(user returns in x minutes|appointment type i, period of time meeting ends n). A calendar (not shown) can be blocked out ahead of time by the system 130 and shared publicly with others on a network or the system can negotiate with users who send requests for meetings that are near other meetings, and provide information that the user "is likely to still be in transit from another meeting," "or likely to still be at lunch" and suggest a better time automatically. A log may also be kept of what the system provided for the user to inspect, and optionally to provide feedback in the form of editing a profile guiding the system's behavior.

Figure 8:
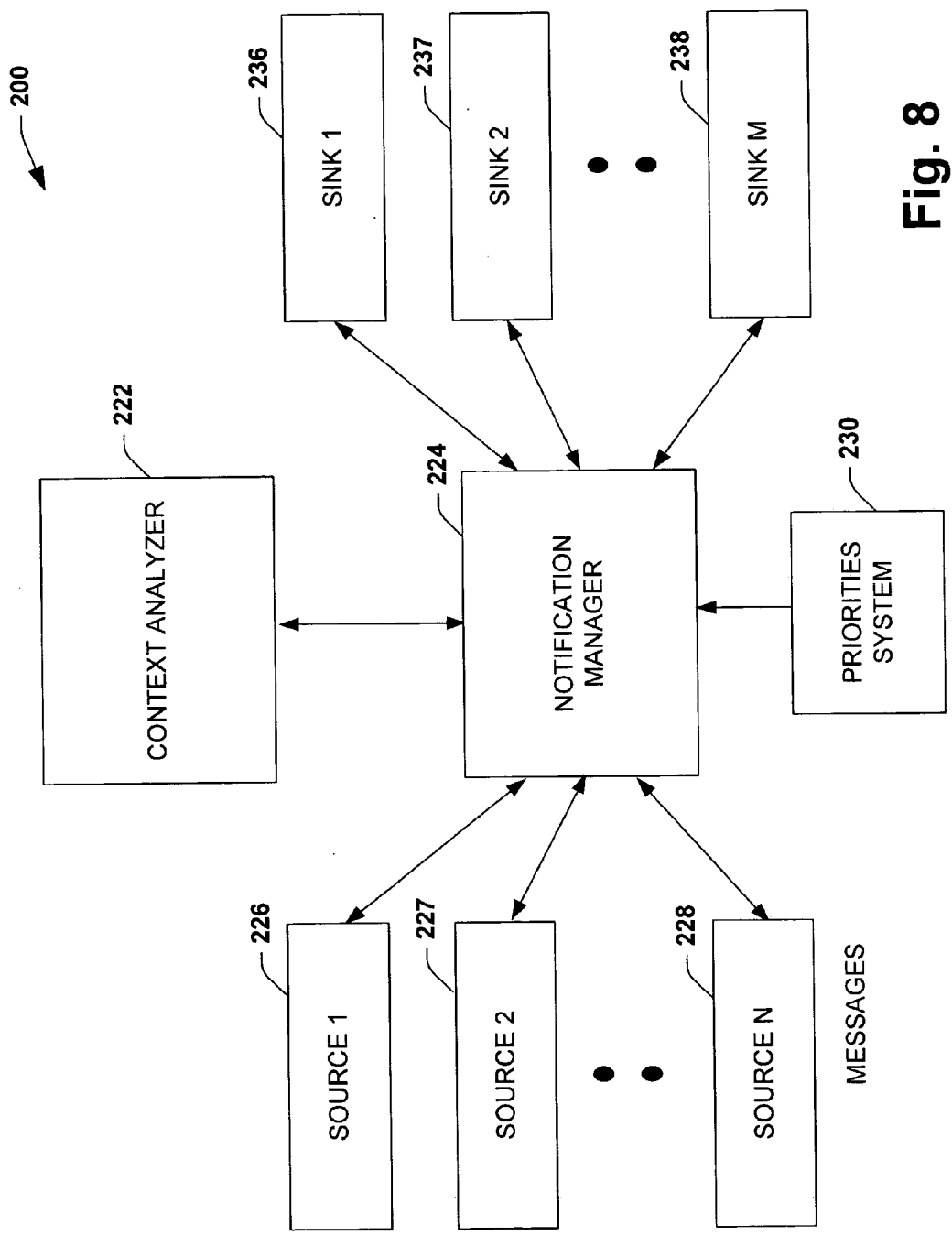
FIG. 8 is a schematic block diagram of a system illustrating a notification platform architecture in accordance with an aspect of the present invention.

Turning now to FIG. 8, a system 200 illustrates a notification architecture and priorities system according to an aspect of the present invention. The system 200 includes a context analyzer 222, a notification manager 224 (also referred to as an event broker), one or more notification sources 1 through N, 226, 227, 228, a priorities system 230 which can operate as a notification source and can provide an automated and/or manual assessment of urgency or priority associated with received information. The system 200 also can include one or more notification sinks, 1 through M, 236, 237, 238, wherein N and M are integers. The sources are also referred to as event publishers, while the sinks are also referred to as event subscribers. There can be any number of sources and sinks. In general, the notification manager 224 conveys notifications, which are also referred to as events or alerts, from the sources 226-228 to the sinks 236-238, based in part on parametric information stored in and/or accessed by the context analyzer 222. The system 200 can employ the forecasting information of a user's availability in accordance with various aspects of the present invention. For example, inferences can be determined according to a time until user will have access to particular communication modalities (e.g., sinks) based upon the forecasting information. Furthermore, display of availability information can be provided on a resource that can be accessed by others (e.g., reply to message indicating user's availability, access to user's calendar providing availability and forecasting information).

The context analyzer 222 stores/analyzes information regarding variables and parameters of a user that influence notification decision-making and can be employed as the user state identifier as described above. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

Figure 9:
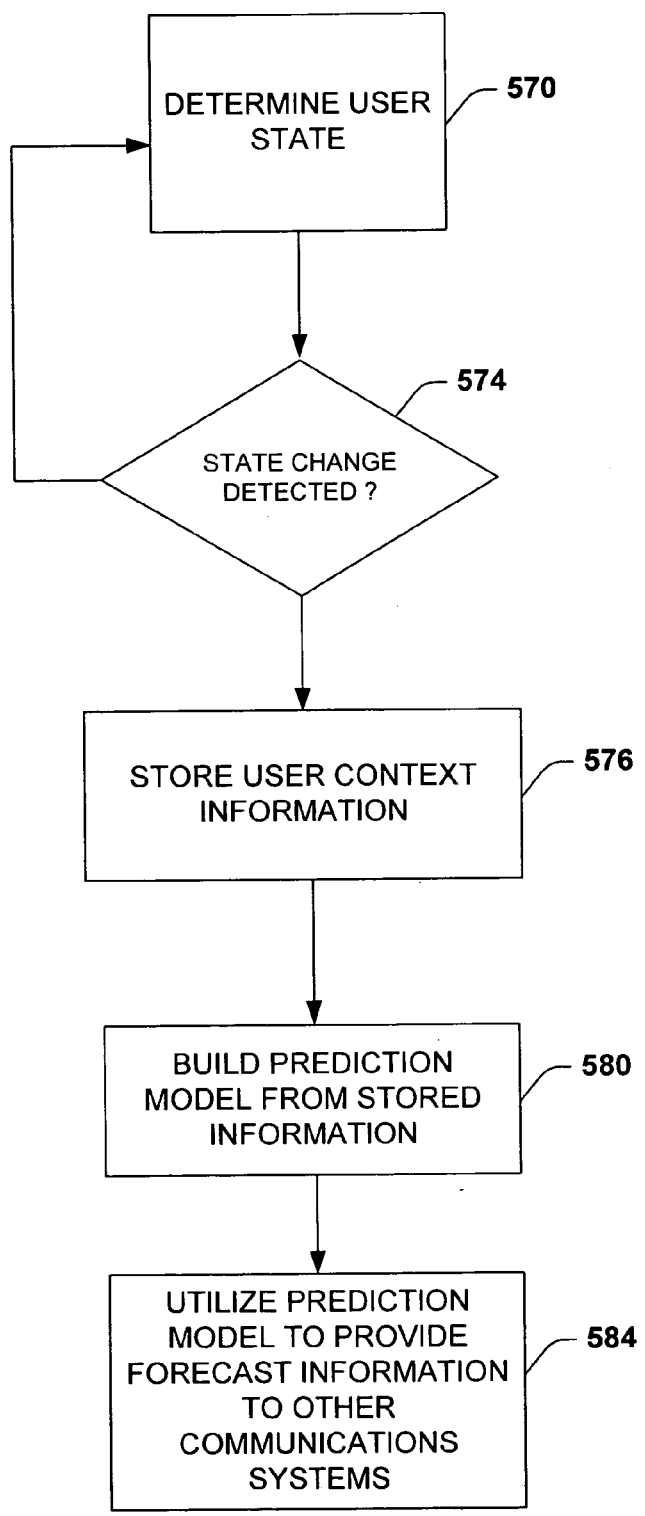
FIG. 9 is a flow diagram illustrating a methodology for learning and inferring a user's availability in accordance with an aspect of the present invention.

FIG. 9 illustrates a methodology in accordance the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 9 and the following discussion, a methodology is provided for learning and inferring a user's availability. At 570, a determination is made as to a current state or context of a user. This may include rules-based and/or statistically-based decisions regarding activities of user's from one or more context information sources. At 574, a determination is made regarding whether a user state change has occurred. For example, a state may include whether or not a user is present or not in front of a desktop computer. This may also include considering probabilities of the user's states, such as the probability a user is available or not. If a state change has not been detected at 574, the process proceeds back to 570 to determine the current state of the user. If a state change has been detected at 574, the process proceeds to 576.

At 576, the process stores contextual information relating to the user at about the time the state change was detected. For example, this may include storing time and date information when the user state changes from one state to another (e.g., time and date when leaving office, time and date when returning). It is noted that many such state changes may be recorded and stored at 576. Proceeding to 580, a prediction model is constructed from the stored information at 576. The prediction model is utilized to provide forecast information regarding the availability and/or expected return of the user at 584. This information may be utilized to coordinate communications in a plurality of systems. These systems can include providing automated responses with associated forecasting information regarding the user's current and expected future status. This may include e-mail, voice mail, priorities and notification, scheduling, maintenance, and/or tracking system utilization of the forecast information.

Figure 10:
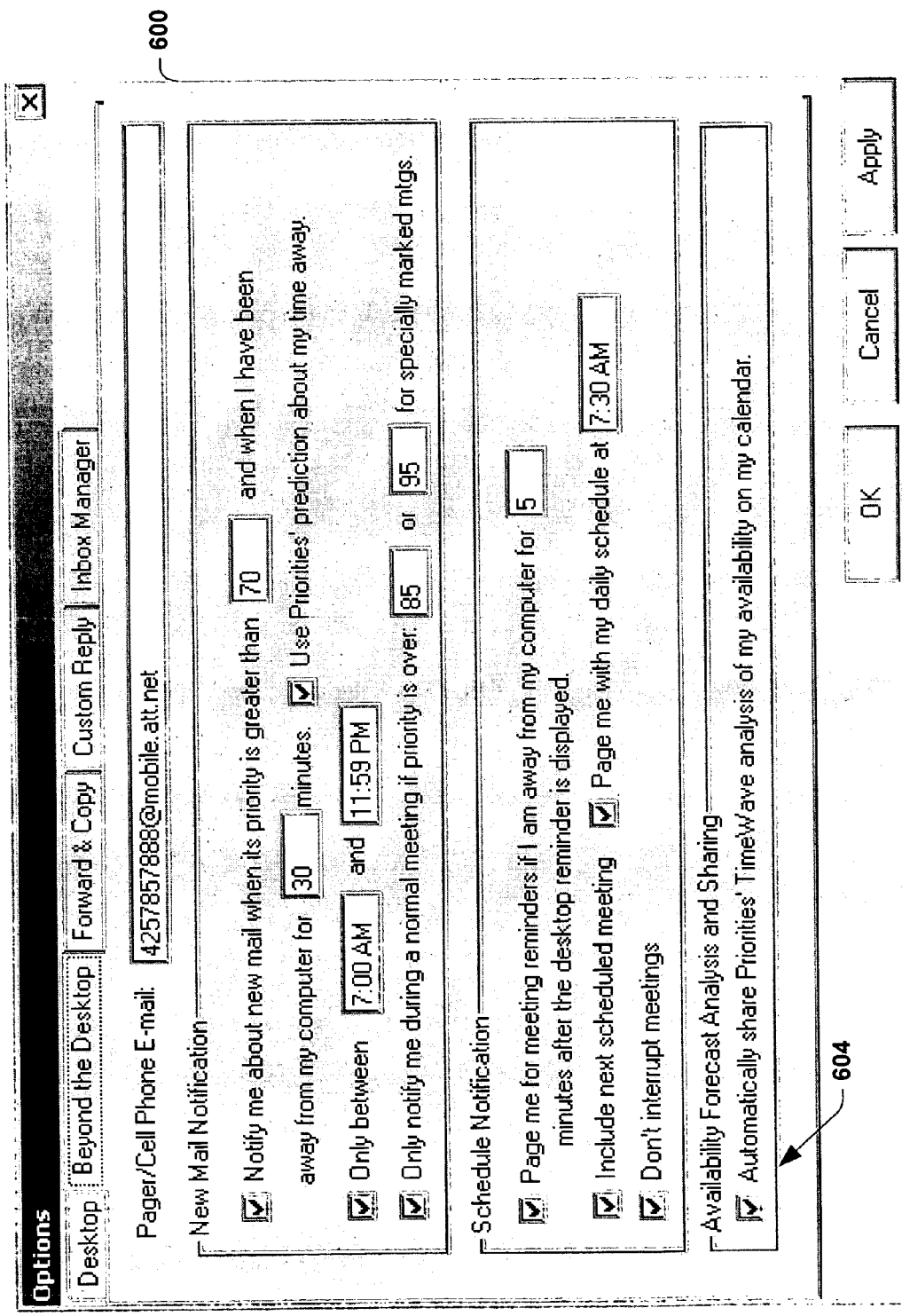
FIG. 10 is a diagram illustrating a user interface to enable sharing of a user's availability in accordance with an aspect of the present invention.

Turning now to FIG. 10, a user interface 600 illustrates how information relating to a user's availability can be employed in conjunction with the notification and priorities systems described above, along with decision-theoretic decision making associated therewith. For example, a selection space 604 can be provided in the interface 600 to enable sharing of an availability/forecasting analysis (e.g., Time-Wave) with other users and/or systems. The analysis can include a probability distribution over the time until a user returns in relation to a situation where he/she can review information that has arrived, to reason about the "expected costs of delayed review of information", for example. Thus, the distribution can be utilized to guide decisions about alerting a user before he/she may observe information (that has arrived in a form that is difficult to review in a current context).

Figure 11:
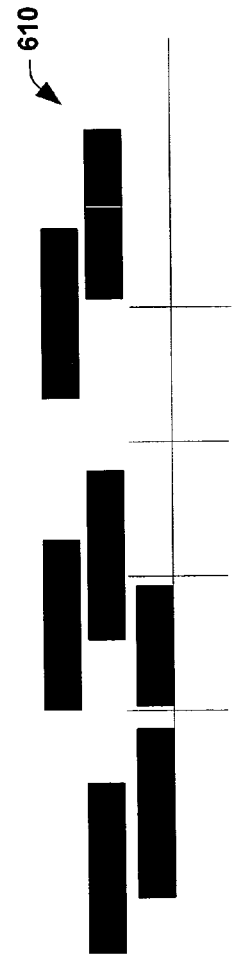
FIG. 11 is a diagram illustrating various aspects of learning about a user's availability in accordance with an aspect of the present invention.

Referring now to FIG. 11, further aspects of the present invention are illustrated. An availability distribution graph 610, illustrates various aspects relating to availability that can be determined for the user and further utilized by other users/systems in accordance with the present invention. For example, the user's presence and durations of absence can be tracked and conditioned on a calendar, time of day, and time away, as described above. A probability distribution as illustrated at 610 can thus be determined over time until the user is expected back. This enables coordination and communications between applications, systems, and/or parties that can be dependent upon the whereabouts and/or availability of the user. The probabilities can be conditioned on different types of appointments that may be observed on a calendar, including such information as the location of meetings (e.g., a meeting location implies different travel times required to return), and meeting types that can be employed to infer whether a user would attend a meeting.

Figure 12:
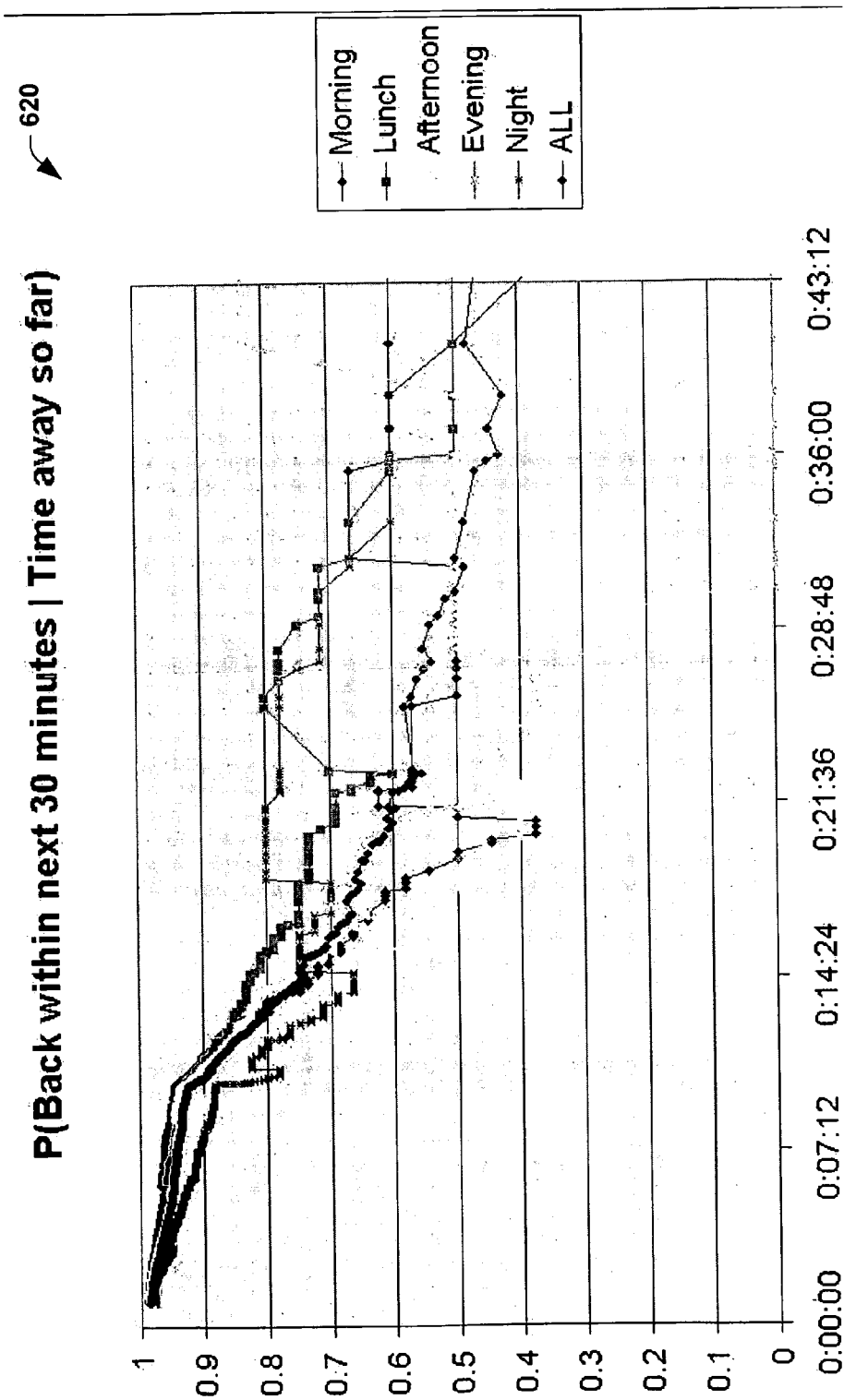
FIG. 12 is a diagram illustrating user availability patterns in accordance with an aspect of the present invention.
Figure 13:
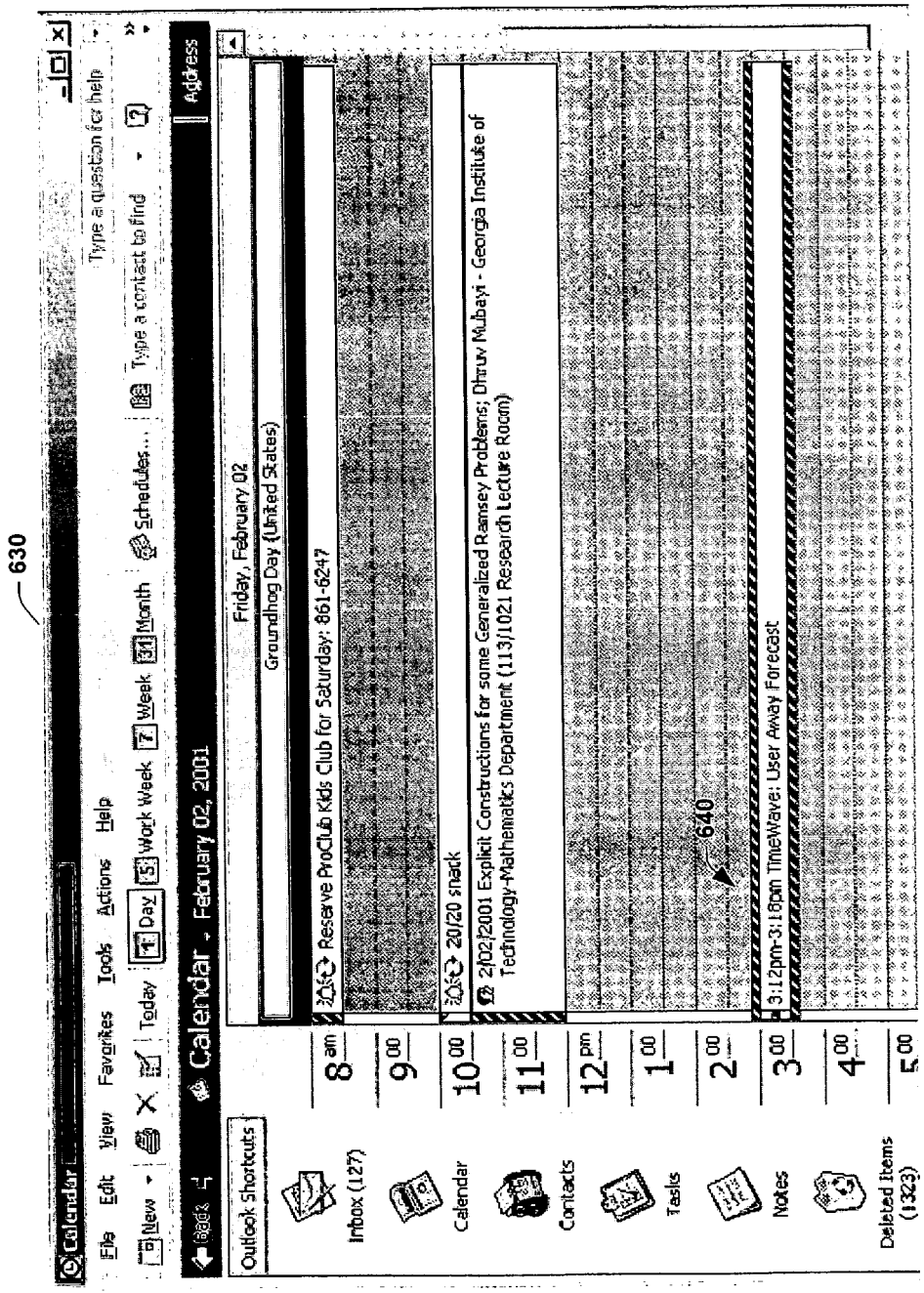
FIG. 13 is a diagram illustrating automated setting of a user's availability in accordance with an aspect of the present invention.

Referring to FIG. 12, a graph 620 depicts determined availability periods for an exemplary user. The graph 620 illustrates determined probabilities that the user will return within thirty minutes given evidence that the user has been away for a given period. Different time period curves are illustrated such as morning, lunch, afternoon, evening, night, and an ALL periods curve. As described above, this information can be shared and/or utilized by other users, systems, and/or applications. This is illustrated in FIG. 13, wherein a calendar provides an automatic indication of the users expected availability and is depicted at 630. This can also include sharing such information selectively based on such considerations as the nature, privileges of the person inspecting a shared calendar, and an inferred urgency of a communications (e.g., the inferred urgency of e-mail, as described above, in relation to the priorities system).

Figure 14:
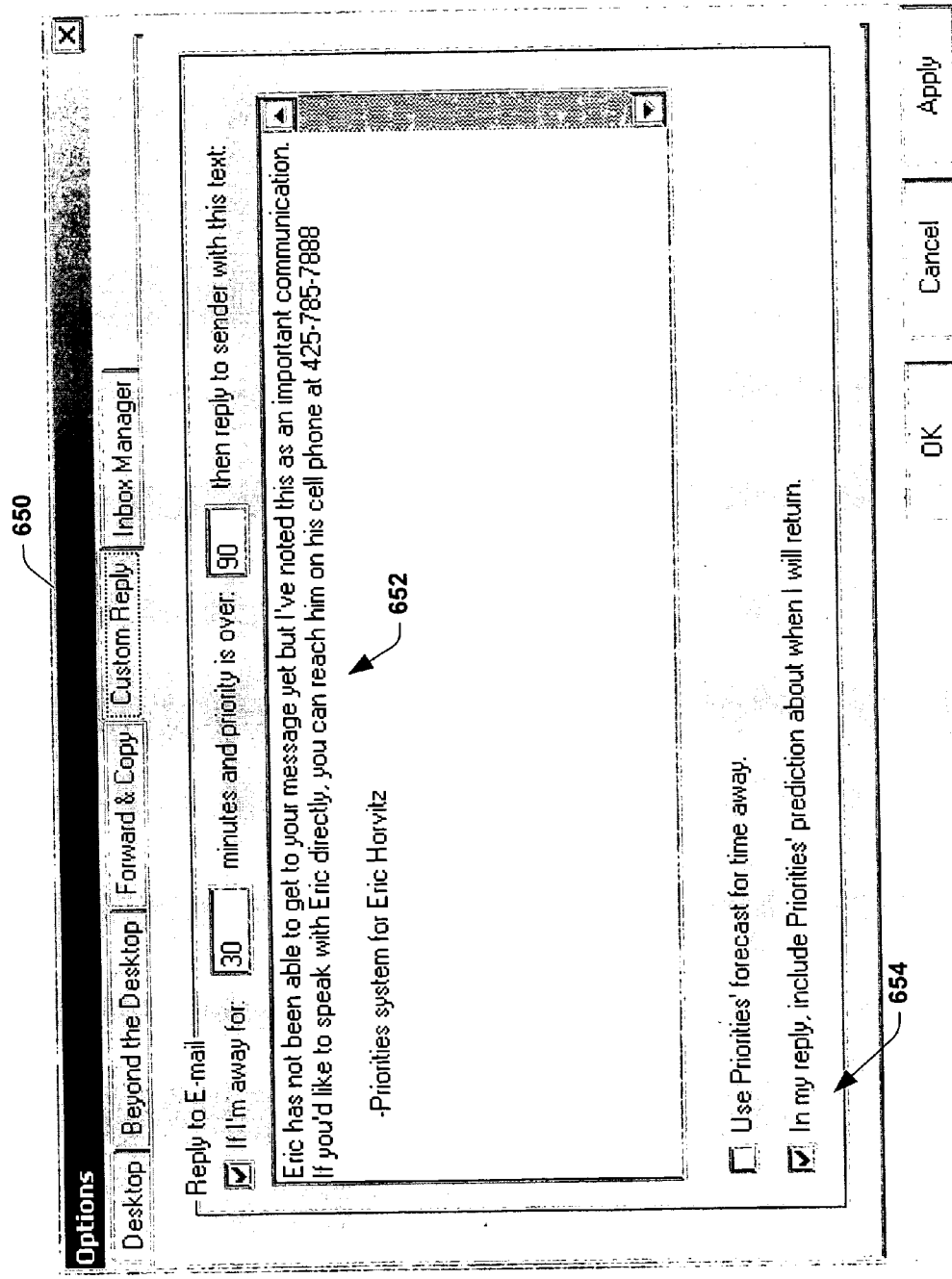
FIG. 14 is a diagram illustrating a user interface to enable communications replies relating to a user's availability in accordance with an aspect of the present invention.

Referring now to FIG. 14, a user interface 650 illustrates an automated reply aspect in accordance with the present invention. For example, a message 652 can be entered by the user. If an important and/or urgent message is received from another user or system, an automated reply can be generated to the other user or system providing the message 652. If a selection box 654, is selected, information regarding the user's likely return/availability can be automatically included with the reply message 652.

Figure 15:
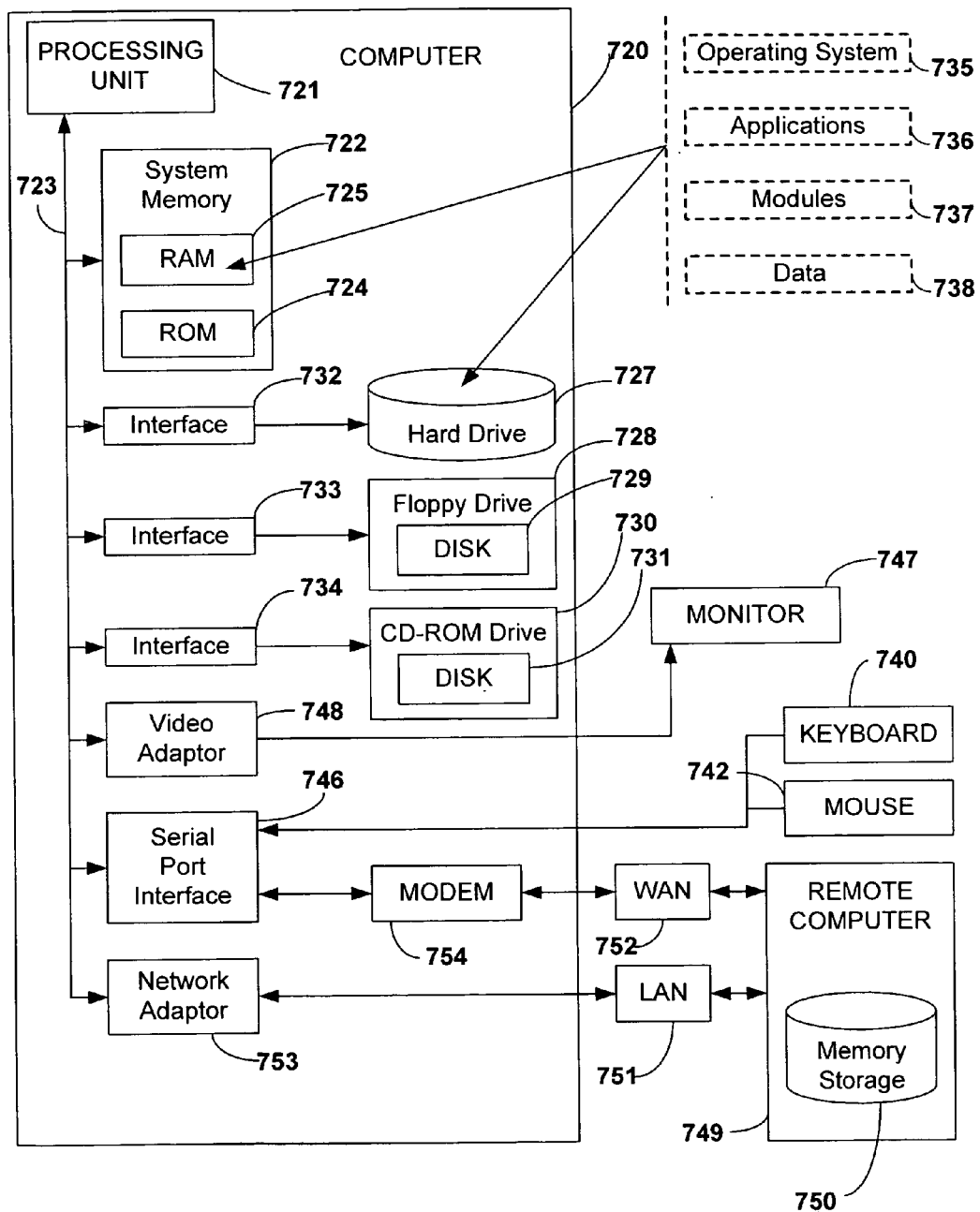
FIG. 15 is a schematic block diagram illustrating a suitable operating environment in accordance with an aspect of the present invention.

In order to provide a context for the various aspects of the invention, FIG. 15 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 15, an exemplary system for implementing the various aspects of the invention includes a computer 720, including a processing unit 721, a system memory 722, and a system bus 723 that couples various system components including the system memory to the processing unit 721. The processing unit 721 may be any of various commercially available processors. It is to be appreciated that dual microprocessors and other multi-processor architectures also may be employed as the processing unit 721.

The system bus may be any of several types of bus structure including a memory bus or memory controller, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 725, including an operating system 735, one or more application programs 736, other program modules 737, and program data 738. It is noted that the operating system 735 in the illustrated computer may be substantially any suitable operating system.

A user may enter commands and information into the computer 720 through a keyboard 740 and a pointing device, such as a mouse 742. Other input devices (not shown) may include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 15. The logical connections depicted in FIG. 15 may include a local area network (LAN) 751 and a wide area network (WAN) 752. Such networking environments are commonplace in offices, enterprise-wide computer networks, Intranets and the Internet.

When employed in a LAN networking environment, the computer 720 may be connected to the LAN 751 through a network interface or adapter 753. When utilized in a WAN networking environment, the computer 720 generally may include a modem 754, and/or is connected to a communications server on the LAN, and/or has other means for establishing communications over the wide area network 752, such as the Internet. The modem 754, which may be internal or external, may be connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A communications system, comprising:
    a logging component that stores user presence information over time that relates to one or more states of the user, the user presence information comprises information that relates to a period of time until the user reviews at least one of a message or an item of information;
    a prediction component associated with the logging component constructed to predict an amount of time until the user reviews the at least one of the message or the item of information based upon at least one of recent or current evidence, or a combination thereof, associated with review of messages or items of information by the user; and
    a component that automatically generates one or more status messages as a function of the user presence information, and communicates the one or more status messages to an entity, the one of more status messages comprises information associated with a specified period of time until the user reviews the at least one of the message or the item of information.

2. The system of claim 1, the one or more states includes at least one of an availability to communicate now via one or more forms of channels of communication, a goal, an attention, or a focus.

3. The system of claim 1, the prediction component reasons in a non-location-specific manner relating to the time until a user will likely be available for communication with one or more channels or devices.

4. The system of claim 3, the one or more channels or devices includes at least one of an e-mail, a telephone, a pager, or a desk-top computer, or a combination thereof.

5. The system of claim 1, the user presence information includes at least one of a schedule information, a location of appointments, or a GPS information, or a combination thereof, associated with the user.

6. A method to coordinate communications systems, comprising:
    determining one or more user states associated with user availability;
    detecting a change of the one or more user states;
    storing user context information associated with the one or more user states at about the time of detecting the change of the one or more user states, the user context information includes information associated with a period of time until the user reviews at least one of a message or an item of information; and
    automatically generating one or more status messages associated with the user context information, and communicating the one or more status messages to an entity, the one of more status messages comprising information that identifies a period of time until the user reviews the at least one of the message or the item of information.

7. The method of claim 6, further comprising building a prediction model from the user context information.

8. The method of claim 7, further comprising
    utilizing the prediction model to generate forecasting information regarding at least one of a user's likely return or current availability, or a combination thereof.

9. The method of claim 8, further comprising
    sharing the forecasting information with at least one of another user, system, or application, or a combination thereof.

10. The method of claim 8, the one or more user states include at least one of a presence, an attention, a focus, a goal, or a location, or a combination thereof, associated with the user.

11. The method of claim 8, further comprising
    automatically generating one or more messages based upon the forecasting information.

12. The method of claim 11, further comprising
    utilizing the one or more messages in at least one of an e-mail system, a voice-mail system, a priorities system, a scheduling system, a maintenance system, or a tracking system, or a combination thereof.

13. A computer storage medium having computer-executable instructions for performing the method of claim 6.

14. A system for learning and inferring a user's availability, comprising:
    a presence detector that determines a user's presence and generates presence data indicating whether the user is present and whether there is a probability of the user's presence, the presence data comprises information that relates to a period of time until the user reviews at least one of a message or an item of information; and
    a data log that stores the presence data generated by the presence detector to accumulate statistics relating to at least availability and unavailability of the user and review of messages or items of information; and
    a component that automatically generates one or more status messages associated with the presence data, and communicates the one or more status messages to an entity, the one of more status messages comprises information that identifies a period of time until the user reviews the at least one of the message or the item of information.

15. The system of claim 14, further comprising:
    a presence predictor constructed from the accumulated statistics to enable a determination of the user's likely return.

16. The system of claim 15, the presence predictor generates prediction information regarding at least one of the user's likely return or the user's current availability, or a combination thereof.

17. The system of claim 14, further comprising an e-mail service that automatically generates one or more messages relating to at least one of the user's likely return or the user's current availability, or a combination thereof.

18. The system of claim 14, further comprising a priority service that automatically generates one or more messages based on an urgency threshold.

* * * * *